United States Patent Office 3,497,327
Patented Feb. 24, 1970

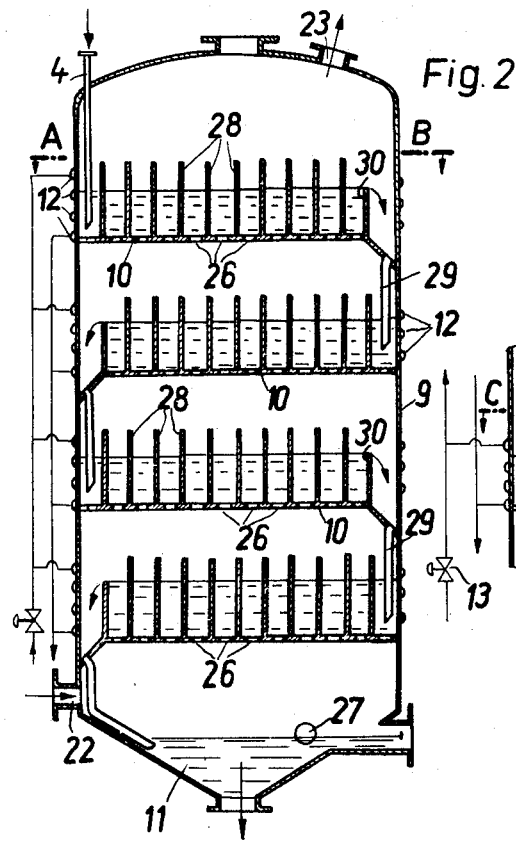
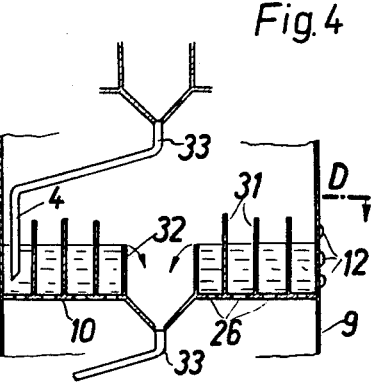
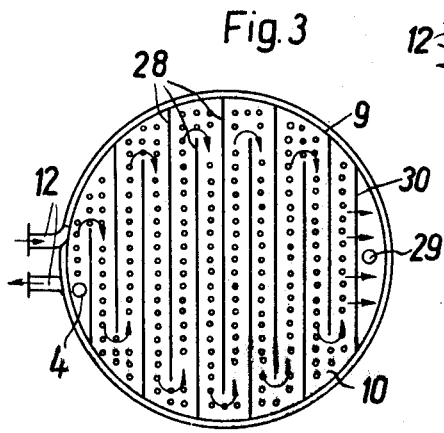
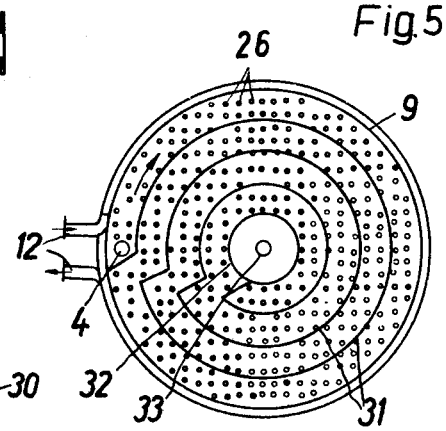

3,497,327
APPARATUS FOR REACTING FLOWABLE AND GASEOUS MATERIALS WITH EACH OTHER
Wolfgang Kehse, Juttastrasse 12,
Berlin 37, Germany
Filed Feb. 1, 1966, Ser. No. 524,261
Int. Cl. B01j 9/16; B01f 3/04; C07b 1/00
U.S. Cl. 23—288                                    11 Claims

ABSTRACT OF THE DISCLOSURE

An apparatus for reacting flowable and gaseous materials with each other comprising a reaction vessel in which a series of horizontal perforated sheets are arranged in vertically spaced relationship so that the reaction vessel will be separated by the perforated sheets into a plurality of superposed closed chambers. Baffles or the like project upwardly from each of the perforated sheets so as to form a tortuous path on the upper face of each sheet for the passage of a flowable mass along such tortuous path. The flowable mass is introduced into the reaction vessel above the uppermost of the perforated sheets, and is passed from each of the sheets, after completion of the tortuous path thereon into the chamber directly below thereof. Gas is introduced into the reaction vessel below the lowermost of the perforated sheets at a pressure sufficiently high to force the gas in upward direction through the perforations of the vertically spaced sheets and also sufficiently high to prevent downward flowing of flowable mass through the perforations. It is achieved thereby that on each upper face of the perforated sheets intimate contact will be caused between the flowable mass passing along the tortuous path and the upwardly rising gas which intimate contact will favor reaction between the gas and the flowable mass. The thus reacted flowable mass is then withdrawn from the reaction vessel.

---

After W. Normann introduced the catalytic hydrogenation of oils and fats, it was repeatedly attempted to carry out this method in a continuous manner. Certain processes were suggested which utilize for continuous hydrogenation a plurality of autoclaves equipped with stirrers, whereby the oil which is to be hardened, i.e., hydrogenated, with the catalyst dispersed therethrough, passes sequentially through a series of such autoclaves while simultaneously hydrogen gas is blown from below into each of the autoclaves, so that the hydrogen gas passes in the form of small gas bubbles through the oil-catalyst mixture. It also has been proposed to use a single autoclave containing several compartments through which the oil-catalyst mixture will pass in sequence, whereby each of the compartments is equipped with suitable pumping devices for remixing the oil-catalyst suspension with hydrogen gas. Other known devices operate with fixed catalysts along which runs, in the presence of hydrogen gas, the oil which is to be hardened, somewhat in the manner of passage through a wash column.

In the production of partially hydrogenated vegetable or animal fats for nutrition purposes, it is desirable to carry out a selective hydrogenation. In this case, selective hydrogenation means that, in a stepwise manner, at first molecules containing several double-bonds are partially hydrogenated, prior to complete saturation of the oil or fat to saturated compounds free of double-bonds. Selective hydrogenation will achieve the uniform consistency of the hydrogenated fat or oil which is desired by the ultimate consumer as well as by the intermediate processor. This uniform consistency is simultaneously improved by the formation of iso acids which takes place during the selective hydrogenation.

In discontinuous batch-wise hydrogenation methods which are generally in use, selective hydrogenation is accomplished by proper adjustment of the reaction conditions such as the hydrogen gas pressure, the temperature, and the amount and the activity of the catalyst. In principle, similar adjustments are possible in a continuous hydrogenation process, however, only under the assumption that, like in a batch process, all oil particles will be exposed to equal chances of reacting with hydrogen.

In other words, the residence time of all oil particles in the reaction vessel or hydrogenation space must be approximately the same. All of the so far proposed continuous hardening or hydrogenation processes are connected with the disadvantage that it is by no means possible to provide for substantially the same length of residence time for all oil particles. Thus, these prior art continuous processes will result in an inhomogeneous or unselectively hardened fat or oil even if reaction conditions are maintained which in a batch process would permit to obtain a selectively hydrogenated and homogeneous product. In the continuous processes, the particles which are maintained in the apparatus for too long a period of time will be hydrogenated up to complete saturation of all double bonds, whereas the particles which pass through the apparatus too quickly will not be hydrogenated or will be hydrogenated only to a small degree. The final product will then consist of an inhomogeneous mixture of an oil or fat the particles of which are hardened or hydrogenated to varying degrees and, consequently, the thus obtained product will be of an undesirable, uneven consistency. Conventionally, the known continuous hydrogenation processes use cascade arrangements, including between 3 and 5 steps. However, the residence time of the individual fat or oil particles will vary over a wide range. A somewhat even distribution of residence times could be expected with cascade arrangements of this type only if the number of steps would be increased to between about 30 and 50. Similarly, unfavorable results are achieved with arrangements containing a stationary catalyst arranged in the manner of a scrubbing tower or wash column. It has been found that such arrangements, with respect to the distribution of residence times of the individual oil or fat particles, are not better than cascade arrangements with 3 to 5 steps. Due to the uneven residence times of the individual oil particles or the like it has not been possible to obtain a satisfactory selective hydrogenation with the apparatus and arrangements suggested up to now.

It is therefore an object of the present invention to overcome the above discussed difficulties and disadvantages.

It is a further object of the present invention to provide a method and apparatus which will permit carrying out of selective hydrogenation of oils, fats and the like in a simple and economical manner and so as to obtain a uniformly hydrogenated product of the desired uniform consistency.

Other objects and advantages of the present invention will become apparent from further reading of the description and of the appended claims.

With the above and other objects in view, the present invention contemplates in an apparatus adapted for reacting a flowable mass with a gas adapted to react therewith, in combintion, a reaction vessel having a side wall, a series of substantially horizontally extending perforated sheets arranged in the reaction vessel vertically spaced from each other and separating the vessel into a plurality of superposed closed chambers, guide means projecting upwardly from the upper face of each of the perforated sheets of the series of perforated sheets forming thereon a tortuous path for passing the flowable mass along the tortuous path, means for introducing the flowable mass into the reaction vessel above the uppermost of the perforated sheets of the series of sheets, passage means for passing the flowable mass upon completion of the tortuous path on one of the sheets of the series of perforated sheets into the chamber directly below the one sheet, gas introducing means for introducing gas adapted to react with the flowable mass into the reaction vessel below the lowermost of the perforated sheets of the series of perforated sheets at a pressure sufficient to pass the gas successively in upward direction through the perforations of the vertically spaced sheets and also sufficient to prevent downward flowing of the flowable mass through the perforations, thereby causing on each of the perforated sheets of the series of perforated sheets intimate contact between the flowable mass and the gas, and reaction between the gas and the flowable mass, and withdrawal means for withdrawing thus reacted flowable mass from the reaction vessel.

The present invention is also concerned with a method of reacting a flowable mass with a gas adapted to react therewith, comprising the steps of passing the flowable mass along tortuous paths along upper faces of a series of vertically spaced substantially horizontally extending perforated plates and from the upper face of each of the plates onto the upper face of the next lower plate, and simultaneously passing a stream of gas, adapted to react with the flowable mass, through the perforations of the perforated plates successively from below the lowermost plate to above the uppermost plate at a pressure and in a quantity sufficient to prevent downward flow of the flowable mass through the perforations and to cause reaction of the flowable mass with the gas while the flowable mass flows along the tortuous path.

According to a preferred embodiment, the present invention is primarily concerned with the hydrogenation of a flowable mass consisting of a fat or oil which is to be hydrogenated and which has solid hydrogenation catalyst particles distributed therethrough, by contact of such flowable mass with hydrogen gas or with a gas containing free hydrogen gas, in the manner indicated above.

An essential feature of the method of the present invention is thus the successive passing of oil or fat, in the presence of a catalyst dispersed therein, along a series of perforated bottoms which are arranged in a column, vertically spaced from each other, in such a manner that the flowable mass consisting of the oil, fat or the like with the catalyst dispersed therein will pass along the upper face of each of the perforated bottoms along a tortuous path which is enforced by suitably arranged guide means on the upper face of the respective perforated sheet or plate forming the perforated bottom. The flowable mass passes successively in downward direction over the upper faces of a series of such perforated plates, along a sequence of meandering or tortuous paths so as to increase the time required for a given portion of the flowable mass to pass along the surface of any one of the perforated plates. Simultaneously, hydrogen gas is circulated through the column defined by the superposed perforated plates. The hydrogen gas passes upwardly through the perforations of the individual perforated plates and thereby prevents downward flow of the flowable mass through these perforations. Thus, the flowable mass will be forced to flow along the tortuous path on each of the perforated plates, in downward direction from one plate to the next lower plate and so on, while the hydrogen gas will flow upwardly through the perforations, more or less in countercurrent to the flowable mass of catalyst-containing oil, fat or the like.

The hydrogen gas is supplied in excess of the amount required for hydrogenation of the oil or fat or the like, so that sufficient gas pressure will be maintained in the perforations of the respective plates, notwithstanding the consumption of some hydrogen gas for hydrogenation of the oil or fat.

The process of the present invention is particularly advantageous, inasmuch as by proceeding in accordance therewith it is for the first time possible, due to the completely uniform hydrogen gas consumption, to introduce hydrogen gas which is produced by electrolysis under pressure, directly from the electrolytic hydrogen gas-producing apparatus into the hydrogenation device or reaction vessel, without requiring any intermediate storing of the hydrogen gas. Furthermore, the supply of electric energy to the electrolytic apparatus, such as a conventional electrolyzer, and thus the amount and pressure of hydrogen gas produced therein, can be automatically controlled corresponding to the desired gas pressure in the hydrogenation apparatus or column, so that in a continuous manner exactly the amount of hydrogen gas will be produced in the electrolytic apparatus which corresponds to the prevailing hydrogen gas consumption in the directly connected hydrogenation column.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

FIG. 2 is a cross sectional elevational view through a reaction vessel or column for hydrogenating fats, oils or the like according to the present invention;

FIG. 3 is a cross-sectional view taken along line A–B of FIG. 2, showing particularly the tortuous path and the guide means which define the tortuous path on a perforated plate;

FIG. 4 is a schematic elevational view in cross section of another embodiment of the bottom portion of the hydrogenating column; and FIG. 5 is a cross sectional view taken along line C–D of FIG. 4.

Figure 1:
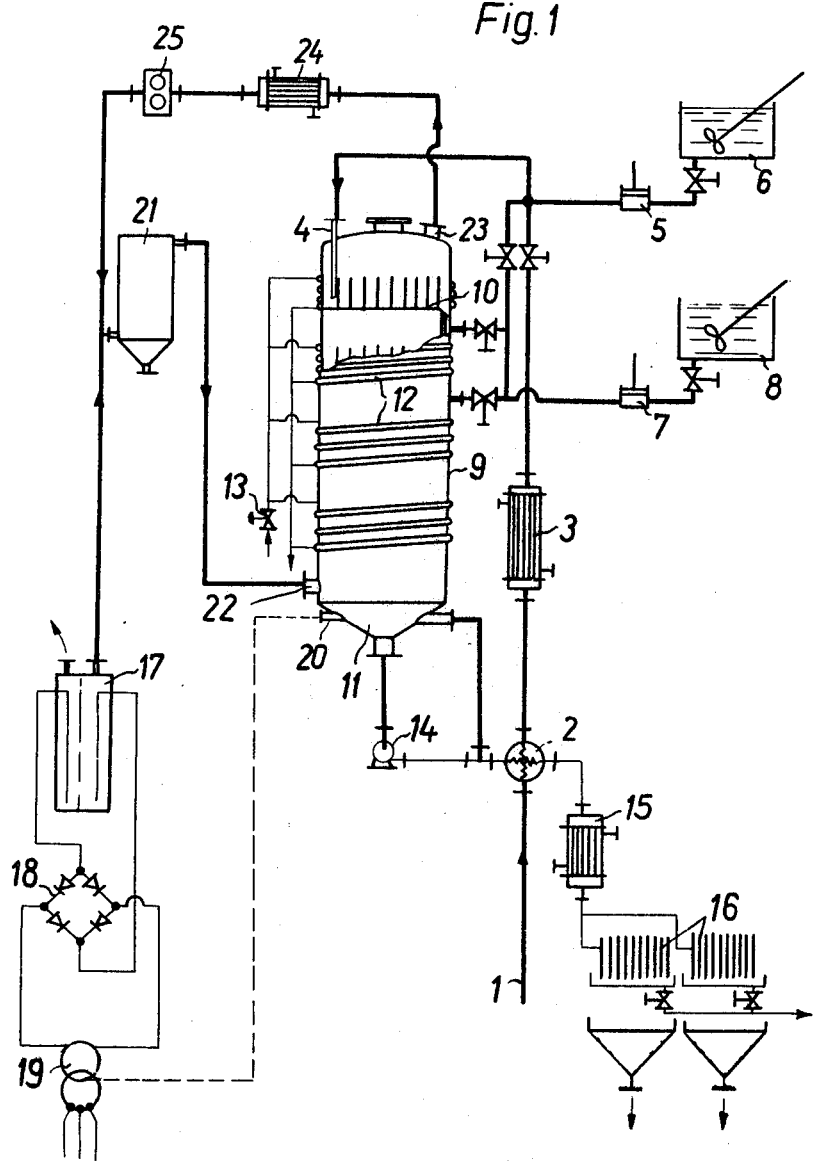
FIG. 1 is a schematic elevational view of an entire arrangement according to the present invention.

Referring now to the drawing, and particularly to FIG. 1, it will be first described how an oil which is to be hydrogenated passes through the reaction vessel or hydrogenating column.

The fresh oil or the like which is to be hydrogenated is introduced into the apparatus through conduit 1 and passes through indirect heat exchanger 2 in which it is heated by indirect heat exchange with hydrogenated fat or oil which has been withdrawn from the hydrogenating column or vessel. The fresh oil or the like then passes through preheater 3 in which it is sufficiently heated so that the hardening process may start. A suspension of previously used catalyst is then introduced from container 6 which is equipped with a suitable stirrer by way of dosimetric pump 5 into the stream of oil, or a suspension of fresh catalyst in oil is introduced into the stream of oil from container 8 by way of dosimetric pump 7. The thus formed suspension of solid, subdivided catalyst in oil is introduced through conduit 4 into the reaction vessel or hydrogenation column. Within hydrogenation column 9, the oil passes over all of the perforated plates 10 which subdivide the hydrogenation column into a series of closed chambers and, while the oil-catalyst mixture passes along a tortuous path over the upper faces of the superposed perforated plates, hydrogen is bubbling through the stream of oil-catalyst mixture flowing along the respective upper surfaces of the perforated plates. Hydrogenation of the oil is completed when the same passes downwardly from the lowermost perforated plate and the thus produced hard fat or hydrogenated product collects in sump 11 of column 9. The reaction heat which is freed during hydrogenation is partly removed by cooling the side wall of column 9 by means of cooling pipes 12 arranged on the outer face of the side wall of column 9, i.e., by passing a suitable cooling fluid through pipes or conduits 12.

The amount of cooling water which is required for this purpose is controlled in a manner known per se by a temperature controlled device 13 so that the temperature of the column will remain constantly at the desired level.

The hardened fat, oil or the like collecting in sump 11 is passed by means of pump 14 through heat exchanger 2 and cooler 15 into a conventional filtering device 16, indicated in FIG. 1 as a pair of filter presses. Preferably, filtering devices which operate in a continuous or semi-continuous manner are used for this purpose, whereby the used and partially spent catalyst will be recovered in the form of a thick suspension. The thus separated catalyst suspension passes from filtering device 16 to container 6 and/or 8 and from there, at least partly, again into the stream of fresh oil which is to be introduced into the hydrogenation column 9.

The hydrogen gas required for the hydrogenation is produced in a conventional electrolytic device 17, preferably a pressure electrolyzer, for producing hydrogen gas pressures of between about 1 and 10 atmospheres above atmospheric pressure. Electric energy is supplied to the electrolyzer 17 by means of rectifier 18 and transformer 19. According to a preferred embodiment of the present invention, the supply of energy to electrolyzer 17 is controlled by a control device 20 which is actuated by the pressure within reaction chamber or hydrogenation column 9, in such a manner that an unchanging, constant pressure will be maintained in reaction vessel 9. This means that at any given moment the amount of hydrogen gas produced in the electrolyzer corresponds to the concurrent consumption of hydrogen gas in reaction vessel 9. Thus, contrary to conventional arrangements, it is not necessary to provide for intermediate storage of the hydrogen gas between production of the same and introduction thereof into the reaction chamber 9. This results in a considerable reduction in the initial investment. The hydrogen gas produced in electrolyzer 17 passes through dryer 21, in which traces of water are removed therefrom, into the lower portion of reaction vessel 9, through inlet 22 thereof and, as will be shown in more detail in FIGS. 2–5, then passes upwardly through the perforations 26 of the respective perforated plates 10 and the flowing oil-catalyst layers on the upper faces of the perforated plates. The hydrogen gas bubbling through the oil-catalyst mixture is partially bound, i.e. consumed by hydrogenation of the oil, and the excess hydrogen gas leaves reaction vessel 9 through outlet 23. The surplus hydrogen gas passes through cooler 24 in which the reaction heat absorbed by the hydrogen gas during passage through the oil layers is withdrawn and the thus cooled hydrogen gas is then compressed in compressor 25 to the pressure of introduction of hydrogen gas at inlet 22. The compressed hydrogen gas is then combined with the freshly produced hydrogen gas and together therewith reintroduced into reaction vessel 9 through inlet 22.

Preferably, the compressed hydrogen gas coming from compressor 25 and the newly produced hydrogen gas are jointly introduced into dryer 21 and from there passed to inlet 22. The ratio of recirculating hydrogen gas to freshly produced hydrogen gas is determined by the consideration that the speed of hydrogen gas passing through the perforations 26 of the uppermost perforated plate 10 must be sufficiently high so that the flowing mass or catalyst-containing fat, oil or the like cannot penetrate through the perforations. Preferably the ratio will be between 3:1 and 10:1. In special cases it may be advantageous to operate with a lower hydrogen gas pressure namely so that the hydrogen gas pressure in the perforation of the uppermost or several upper perforated plates is not sufficient to prevent a downward flowing of oil-catalyst mixture through perforation 26 of the respective perforated plate 10. In such cases, it is possible to introduce into reaction vessel 9 once, preferably at the beginning of the process, a certain amount of inert gas which will dilute the circulating hydrogen gas so that a higher total pressure but a lower hydrogen gas partial pressure will prevail.

The conditions which are required to achieve the desired degree of hardening or hydrogenation, as well as to achieve the desired selectivity of hydrogenation, can be easily adjusted, by changing the activity or the amount of the catalyst and/or the temperature and the pressure prevailing in the reaction vessel 9.

Referring now to FIG. 2 in which the reaction vessel or hardening column 9 is shown in more detail, particularly with respect to the perforated plates built into the same, it will be seen that the oil to which finely subdivided catalyst has been admixed is introduced into column 9, through inlet conduit 4 and passes successively over the perforated plates 10 which are arranged in vertically spaced relationship within column 9 so as to subdivide column 9 into a series of superposed closed chambers which communicate with each other only through perforations 26 and conduits 29. Hydrogen gas is introduced into column 9 through inlet 22 and passes in upward direction through the perforations 26 of the superposed perforated plates 10 and through the catalyst-containing fat, oil or the like layers flowing along the upper surfaces of the superposed perforated plates, respectively. During passage of the hydrogen gas through the oil layers, a portion of the hydrogen gas is consumed i.e. is used up for hydrogenation of the oil. The amount of hydrogen gas which is introduced through inlet 22 is so chosen that even in perforations 26 of the uppermost perforated plate 10 the speed of flow or the pressure of the hydrogen gas will still be sufficiently high so that the flowing oil or the like cannot penetrate through perforations 26. The hydrogen gas which has not been bound to oil during hydrogenation of the same is withdrawn through outlet 23 at the top of column 9. The thus hydrogenated oil flows from the lowermost perforated plate 26 into the sump 11 of column 9, and is maintained at a certain level therein by operation of float control 27. It will also be seen that the oil after passing along a tortuous path at the upper surface of any one of perforated plates 26 passes downwardly towards the next lower perforated plate 26 or towards sump 11 through the respective conduit 29.

Float control 27 controls operation of pump 14 so that the amount of oil which is withdrawn from sump 11 will correspond to the amount of oil introduced into the reaction vessel through conduit 4.

FIG. 3 illustrates in a plan view a perforated plate 10 which is particularly suitable for use in accordance with the present invention. As compared with a perforated plate of the type which is utilized in rectification or wash columns, perforated plate 10 has only relatively few perforations 26 of small diameter through which hydrogen gas under pressure passes in upward direction. The oil layer on top of each of the perforated plates, for instance, may have a height of between 300 and 1,000 millimeters and is prevented from flowing downwardly through the perforations by the hydrogen gas which bubbles upwardly through the same. The oil or the like which is to be hardened and which is intimately mixed with the dispersed catalyst is introduced through conduit 4 onto uppermost perforated plate 10 and is forced by guide means or baffle plates 28, which form narrow channels on the surface of perforated plate 10, to flow along the surface of plate 10 in a tortuous path. The height of baffle plates 28 must be greater than the desired height of the oil layer on the respective perforated plate. After completing passage through the narrow channel, the oil is withdrawn from the respective perforated plate surface by flowing over overflow 30 and then passing through pipe 29 downwardly to a point above the surface of the next lower perforated plate.

FIGS. 4 and 5 illustrate another preferred embodiment of perforated plates 10 including baffle plates 31 which are arranged in a helical pattern. In this case, as described above, the oil is introduced through conduit 4 onto uppermost perforated plate 10 and passes through a long helical channel to the center portion of perforated plate 10 from where the oil passes over overflow 32 and pipe 33 toward the next lower perforated plate.

For controlling the temperature within reaction chamber 9, i.e., either for heating of the same or for withdrawing reaction heat therefrom, cooling conduits 12 are arranged on the outer face of the side wall of reaction vessel 9, particularly at the portions of the side wall which are juxtaposed to the oil layers on top of the respective perforated plates. A suitable heating or cooling fluid is then passed in conventional manner through conduits 12.

Controlling the operation of the electrolyzer so as to produce a hydrogen gas at the desired constant pressure, may be carried out by means of conventional pressure control devices which may be either associated with transformer 19 or which in another manner, for instance by controlling the rectifier, will control the amount of electric power introduced into the electrolyzer so that the pressure of the produced hydrogen gas will remain constant at the desired level.

The electrolyzers which are utilized according to the present invention are conventional devices well known to those skilled in the art. However, broadly, the present invention with respect to the manner in which the oil and hydrogen gas are reacted with each other may also be carried out with hydrogen gas from another source such as a storage container, or with hydrogen gas which is produced by a non-electrolytic process.

The conditions under which selective or unselective hardening of hardenable oils and fats and the like is obtained are well known to those skilled in the art and described for instance in publications and textbooks by Baily, Kaufmann, Rudischer and Luecke.

The catalysts which are utilized according to the present invention are those which are conventionally used for hydrogenation of oils such as commercially available nickel catalysts, or platinum or palladium catalysts. The oil or fat which is to be hydrogenated may be any oil or fat which can be subjected to hydrogenation, and the final product may be of any desired degree of hydrogenation.

For instance, if stearic acid with an iodine number of below one is to be produced from a mixture of saturated and unsaturated fatty acids with 18 carbon atoms, temperatures of the magnitude of 250° C., gauge pressures of up to 25 atmospheres and relatively large amounts of catalysts will have to be utilized.

On the other hand if, for instance, by slight hydrogenation the iodine number of illipe fat is to be lowered by 1–2 units and in this manner a substitute for cocoa butter is to be produced, then the pressure in the hardening or hydrogenating column or reaction vessel may be as little as between 0.5 and 1 atmosphere above atmospheric pressure, the hardening temperature as low as between 160 and 180° C., and relatively small amounts of catalysts of low activity may be used.

In most conventional hardening processes for producing the starting materials for the margarine and shortening industry, pressures of between 2 and 3 atmospheres above atmospheric pressure, temperatures of between 210 and 230° C., and commercially available carrier-nickel catalysts are utilized.

It will be understood that each of the elements described above, or two or more together, may also find a useful application in other types of hydrogenation devices differing from the types described above.

While the invention has been illustrated and described as embodied in a hydrogenation device for the hardening of fats and oils, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be secured by Letters Patent is:

1. An apparatus for reacting a flowable mass with a gas adapted to react therewith comprising, in combination, a substantially closed upright reaction vessel; at least one foraminous wall extending substantially horizontally through said reaction vessel and dividing the latter in an upper chamber and a lower chamber; wall means projecting upwardly from said foraminous wall and forming a tortuous path in said upper chamber communicating at one end thereof with said lower chamber; first passage means for feeding a flowable mass into said upper chamber and into the other end of said tortuous path so that said mass will flow along said tortuous path before passing into said lower chamber; second passage means for feeding a gas under pressure into said lower chamber so that the gas will pass through said foraminous wall to react with said flowable mass as the latter flows along said tortuous path; first discharge means communicating with the bottom end of said upright reaction vessel for discharging the thus reacted flowable mass therefrom; second discharge means communicating with the upper end of said reaction vessel to discharge the gas therefrom; gas producing means communicating with said second passage means; pressure sensing means for sensing the gas pressure in said reaction vessel; and control means actuated by said sensing means and cooperating with said gas producing means for controlling the amount of gas produced in such a manner to maintain a predetermined gas pressure in said reaction vessel.

2. An apparatus as defined in claim 1, wherein a plurality of foraminous walls extend vertically spaced from each other through said reaction vessel and wherein wall means forming a tortuous path project upwardly from each of said foraminous walls, said first passage means being arranged for feeding said flowable mass into the other end of the tortuous path formed by the wall means on the uppermost foraminous wall and said second passage means being arranged to feed said gas into the lower chambtr formed beneath the lowermost of said foraminous walls.

3. An apparatus as defined in claim 2, wherein said flowable mass is a mixture including an unsaturated organic compound and a hydrogenation catalyst adapted in the presence of hydrogen to cause hydrogenation of said unsaturated compound, and wherein said gas consists at least partly of hydrogen gas produced in said gas producing means.

4. An apparatus as defined in claim 3, wherein said hydrogen gas producing means include electrolytic means for electrolytic decomposition of a substance to form hydrogen gas upon being subjected to electrolytic decomposition, and wherein said control means control the amount of electric energy supplied to said electrolytic means in such a manner so as to maintain said predetermined pressure in said reaction vessel.

5. An apparatus as defined in claim 3, and including gas drying means connected to said second passage means between said gas producing means and said reaction vessel.

6. An apparatus as defined in claim 3, and including gas circulating means connected to said second discharge means for withdrawing hydrogen containing gas from said upper end of said reaction vessel and for reintroducing said gas into the lower chamber beneath the lowermost of said plurality of foraminous walls.

7. An apparatus as defined in claim 6, and including cooling means associated with said circulating means for cooling withdrawn hydrogen-containing gas passing through said circulating means.

8. An apparatus as defined in claim 6, and including gas drying means communicating with said circulating means and said gas producing means, and also with said second passage means for drying hydrogen-containing gas prior to introduction of the same into said reaction vessel.

9. An apparatus as defined in claim 8, wherein said gas drying means is a single means.

10. An apparatus as defined in claim 1, and including cooling means comprising conduit means along the wall of said reaction vessel for cooling said reaction vessel by passage of cooling liquid through said conduit means.

11. An apparatus as defined in claim 1, and including indirect heat exchange means communicating with said first passage means for introducing a flowable mass into said reaction vessel and with said first discharge means, for subjecting the flowable mass to be introduced into said reaction vessel and the reacted flowable mass withdrawn therefrom to indirect heat exchange.

References Cited

UNITED STATES PATENTS

| 2,762,819 | 9/1956 | W. F. Bollens | 260—409 |
| 3,172,922 | 3/1965 | Wikehse | 261—114 XR |

JAMES H. TAYMAN, JR., Primary Examiner

U.S. Cl. X.R.

23—260, 283; 260—409, 690; 261—20, 113